(12) United States Patent
Zheng

(10) Patent No.: US 7,362,866 B2
(45) Date of Patent: Apr. 22, 2008

(54) METHOD FOR DETERMINING ENCRYPTION ALGORITHM OF SECRET COMMUNICATION BASED ON MOBILE COUNTRY CODES

(75) Inventor: Zhibin Zheng, Shenzhen (CN)

(73) Assignee: Huawei Technologies, Co., Ltd. (CN)

( * ) Notice: Subject to any disclaimer, the term of this patent is extended or adjusted under 35 U.S.C. 154(b) by 399 days.

(21) Appl. No.: 10/499,284

(22) PCT Filed: Mar. 29, 2002

(86) PCT No.: PCT/CN02/00226

§ 371 (c)(1),
(2), (4) Date: Jun. 18, 2004

(87) PCT Pub. No.: WO03/056851

PCT Pub. Date: Jul. 10, 2003

(65) Prior Publication Data

US 2005/0078828 A1   Apr. 14, 2005

(30) Foreign Application Priority Data

Dec. 21, 2001   (CN)   ............................... 01 1 44638

(51) Int. Cl.
*H04K 1/00* (2006.01)
*H04L 9/28* (2006.01)
(52) U.S. Cl. .................................. 380/270; 380/28
(58) Field of Classification Search ............. None
See application file for complete search history.

(56) References Cited

U.S. PATENT DOCUMENTS 105,174 A  *  7/1870  McClure et al. .........  83/699.21

(Continued)

FOREIGN PATENT DOCUMENTS

WO   WO 00/31917   6/2000

(Continued)

OTHER PUBLICATIONS

"Integrity protection procedures"; GPP TSG SA WG 3 (Security) 3G Change Request TS 33.102 CR 13; Sep. 29, 1999; pp. 1-11; XP002345978.

*Primary Examiner*—Nasser Moazzami
*Assistant Examiner*—Brandon S Hoffman

(57) ABSTRACT

The present invention discloses a method for determining encryption algorithm used in security communication based on Mobile Country Code (MCC) number. In this method, a Mobile Country Code (MCC) number list is preset in a Core Network (CN), and all the MCC numbers of those countries or service providers adopting the same self-developed encryption algorithms as those adopted by the homeland are stored in this MCC number list. When a User Equipment (UE) is calling or being called, the UE sends an International Mobile Subscriber Identifier (IMSI) information of the current subscriber to the CN, and the CN parses the information and extracts the MCC number after receiving the IMSI information. The CN compares the extracted MCC number of the current subscriber with elements of the MCC number list one by one, if the MCC number of the current subscriber is identical with a certain MCC number in the MCC number list, the CN selects the domestic self-developed encryption algorithm; if the MCC number of the current subscriber is not identical with any MCC number in the MCC number list, the CN selects an available standard encryption algorithm for the security communication. The CN sends the UEA of the selected encryption algorithm to an access network; then the access network sends the UEA of the selected encryption algorithm to the UE. The present method not only allows the coexistence of standard encryption algorithms and self-developed encryption algorithm, but also simplifies the process of encryption algorithm selection. Accordingly, the subscriber interest and service quality is guaranteed.

12 Claims, 2 Drawing Sheets

U.S. PATENT DOCUMENTS

| | | | | |
|---|---|---|---|---|
| 5,732,349 A | * | 3/1998 | Sanpei et al. | 455/435.1 |
| 5,781,628 A | * | 7/1998 | Alperovich et al. | 380/258 |
| 5,999,811 A | * | 12/1999 | Molne | 455/432.3 |
| 6,256,497 B1 | * | 7/2001 | Chambers | 455/433 |
| 7,113,600 B1 | * | 9/2006 | Rosenhed | 380/272 |

FOREIGN PATENT DOCUMENTS

| | | |
|---|---|---|
| WO | WO 01/05174 | 1/2001 |
| WO | 01/15174 A1 | 3/2001 |
| WO | WO 01/15478 | 3/2001 |
| WO | 01/35691 A1 | 5/2001 |

* cited by examiner

METHOD FOR DETERMINING ENCRYPTION ALGORITHM OF SECRET COMMUNICATION BASED ON MOBILE COUNTRY CODES

FIELD OF THE TECHNOLOGY

The present invention relates to the selection of encryption algorithm used in security communication in 3rd Generation (3G) system, and more particularly to a method for determining encryption algorithm used in security communication by Core Network (CN) based on Mobile Country Code (MCC).

BACKGROUND OF THE INVENTION

At present, in all kinds of communication systems and particularly in mobile communication systems, the implementation of security communication is of great importance for guaranteeing security of information transmitted between subscribers. Therefore, it is necessary to protect the data being transmitted with encryption. Generally, encrypting the data for protection means an encryption algorithm is adopted by both the communication sides. The transmit side encrypts the data to be transmitted with a selected encryption algorithm and then transmits the encrypted data, which is decrypted with the selected algorithm after being received by the receive side.

In 3G mobile communication systems, the encryption function of air interface is usually implemented between a User Equipment (UE) and UMTS terrestrial Radio Access Network (RAN). According to the regulation of the prior protocol, each encryption algorithm corresponds to one single User Encryption Algorithm (UEA). An encryption algorithm is determined through comparing the algorithms supported by UE and the available algorithms designated by CN and through comparing the UEAs in the access network. As shown in FIG. 1, the specific implementing process of the air interface encryption protection in the prior mobile communication system is as follows:

1) UE sends UE security capability to the access network.

After the successful connection between UE and the access network, the UE sends its encryption algorithm capability parameters to the access network by way of a message A, notifying the access network the encryption algorithms supported by the UE. On receiving the message A, the access network stores the encryption algorithm information supported by the UE.

2) CN initiates establishment of security mode.

When initiating establishment of security mode, the CN determines the available encryption algorithms according to the presetting and sends to the access network a message B carrying the encryption algorithm information supported by the network.

3) The access network determines the encryption algorithm used in security communication.

After receiving the message B, the access network determines an encryption algorithm supported by both the UE and the access network for the security communication according to the received UEAs supported by the CN and the pre-stored UEAs supported by the UE. Then the access network sends to UE a message C carrying the determined UEA, notifying CN the finally determined encryption algorithm.

4) UE sets local security algorithm.

After receiving the message C, firstly the UE sets the encryption algorithm designated in the received message C as the local terminal security encryption algorithm; then the UE sends to the access network a message D indicating the successful setting of security mode.

5) The access network notifies CN of the successful security mode setting.

After receiving the message D, the access network sends to CN a message E which carries the selected encryption algorithm parameters and indicates the successful setting of security mode.

6) CN completes the security mode setting procedure.

After receiving the message D indicating the successful setting of security mode, the CN completes the self-setting of security mode procedure and then waits until the predetermined time is due. When the predetermined time is due, the UE and the access network begins security communication in which the encryption algorithm corresponding to the selected UEA is employed to encrypt or decrypt data.

During the above-mentioned procedure, the encryption algorithms used for encryption and decryption at air interface are placed in the terminal and access network respectively. Those encryption algorithms supported by CN must be supported by the access network. Generally speaking, encryption algorithm isn't unique. Many different kinds of encryption algorithms can be defined and each one corresponds to a single UEA. Service providers can support selection of different encryption algorithms. However, because air interface encryption is equally implemented in both access network and terminal, access networks and terminal equipments of different service providers must have intercommunication in consideration of the intercommunication among different access networks and terminal equipments. So, all the prior encryption algorithms are required to be standard encryption algorithms regulated by the protocol.

If the regulation comprises more than one standard encryption algorithm, in order to support global roam, the system must include all the standard encryption algorithms. Accordingly, all the standard encryption algorithms will be supported by CN. If it is found after comparison that the terminal and access network have more than one identical standard encryption algorithm available, because the method for selecting encryption algorithms and the priority about selection is not defined in the regulation, the access network can select any one of the standard encryption algorithms available for security communication, if only the terminal and access network adopt the same algorithm. If no identical encryption algorithm is available in the terminals and the access networks but encryption is required in CN, normal security communication cannot be provided to the terminal.

Due to the particularity of password application and in consideration of the information safeness and security of one's country or network, different countries or service providers prefer to use their individual encryption algorithms respectively in order to prevent uncertain loss which results from the ease of decrypting the password. Thus, two problems appear when the user is roaming:

1) In respect of the terminal and the access network, if one side supports a self-developed encryption algorithm which isn't supported by the other side, the two communication sides fail to select an encryption algorithm supported by both sides, which results in the failure of normal security communication.

2) For some countries or service providers who have to adopt self-developed encryption algorithms for air interface security communication, the prior mobile communication system reserves some UEAs to go with the self-developed encryption algorithms. However, since there is no unified prescription concerning use of the reserved UEAs, every country or service provider can choose any one of the reserved UEAs. So, the problem of encryption algorithm conflict may occur during the roam of mobile subscribers. For example, two different countries adopt different self-developed encryption algorithms, but these two countries choose the same UEA for their encryption algorithms. In terms of the prior setting procedure of security mode, when a subscriber of one country roams to another country and the encryption algorithms are consulted, a normal connection will be established between both parts because of their equal UEA value, but normal communication cannot be realized because of different encryption algorithms.

Accordingly, a solving scheme has been provided in another patent application, which is as follows: a CI is added, and judgment for CI and judgment for encryption algorithms supported by the current subscriber and the network is also added. If a subscriber is a foreign subscriber and both the UE and network support the standard encryption algorithm, or if the subscriber is a domestic subscriber and both the UE and network support a self-developed encryption algorithm other than the standard encryption algorithm, normal security communication can be implemented; otherwise, security communication is unavailable. However, since a step of defining bits and a judge step are added, the whole message structure, message delivery procedure, parameter setting and control flow need to be added or changed accordingly. Thus the present processing flow is partly affected and the implementation is inconvenient.

SUMMARY OF THE INVENTION

Therefore, a main object of the present invention is to provide a method for determining encryption algorithm used in security communication based on MCC, which enables the subscriber to perform security communication utilizing effective encryption algorithm anywhere. This method not only allows the coexistence of standard encryption algorithms and self-developed encryption algorithm, but also simplifies the process of encryption algorithm selection. Accordingly, the subscriber interest and service quality is guaranteed.

To achieve the above-mentioned object, the specific technical scheme of this invention is as follows.

A method for determining encryption algorithm used in security communication based on MCC, comprising:

setting a MCC number list in a CN, and storing all the MCC numbers of those countries or service providers adopting the same self-developed encryption algorithms as those adopted by the homeland in this MCC number list;

when a UE is calling or being called, the UE sending an International Mobile Subscriber Identifier (IMSI) information of the current subscriber to the CN, the CN parsing the IMSI information and extracting the MCC number after receiving the IMSI information;

if the MCC number list in the CN is null, which means the current subscriber supports all of the available standard encryption algorithms, the CN directly selecting an available standard encryption algorithm for the security communication; otherwise, the CN comparing the extracted MCC number of the current subscriber with elements of the MCC number list one by one, if the MCC number of the current subscriber is identical with a certain MCC number in the MCC number list, the CN selecting the domestic self-developed encryption algorithm for the security communication; if the MCC number of the current subscriber is not identical with any MCC number in the MCC list, the CN selecting an available standard encryption algorithm for the security communication;

the CN instructing the UE and an access network to start security communication with the selected encryption algorithm.

Wherein said CN instructing the UE and the access network to start security communication with the selected encryption algorithm comprise: after selecting the encryption algorithm, the CN sending the UEA of the selected encryption algorithm to an access network; then the access network setting its own security mode and sending the UEA of the selected encryption algorithm to the UE, the UE setting its own security mode after receiving the UEA; the UE and the access network starting security communication with the selected encryption algorithm.

The method further comprises: the CN storing the extracted MCC number in a register after extracting the MCC number of the current subscriber.

From the technical scheme described above, it can be seen that the key point of this invention lies in: setting a MCC number list in CN and directly determining the encryption algorithm for security communication in CN according to MCC number.

Accordingly, this method for determining encryption algorithm used in security communication based on MCC has the following advantages and characteristics:

1) The method according to the present invention just needs to empower the CN to determine the final selection of encryption algorithms. No need to change any of the prior security execution flow. And the whole processing procedure will not be affected. Furthermore, the procedure of selecting the encryption algorithm is simplified.

2) The process of extracting MCC number from the IMSI information is added in the present invention. Since the IMSI used for extracting MCC number of the current subscriber is provided by the existing messages in the processing flow, there is no need to add any bit or message. The process is easy and convenient to realize.

3) In the method according to the present invention, since a MCC number list is preset in the CN and all the MCC numbers of those countries or service providers adopting the same self-developed encryption algorithms as the domestic are stored in the MCC number list, when the subscriber is roaming, the CN can determine an encryption algorithm by comparing the MCC number of the current subscriber and elements of the pre-reserved MCC number list. In this way, possible conflict is prevented when the subscriber roams; meanwhile intercommunication among the friendly service providers, who have specific requirements and adopt the same self-developed encryption algorithm, is guaranteed.

4) The method according to the present invention changes the original settled manner of encryption algorithm selection to a manner by comparing and choosing MCC number. Meanwhile the selection course is performed by CN other than the access network. This method is easy and flexible to implement, and applies to various kinds of mobile communication networks with pretty generalization.

5) The pre-reserved MCC number list in the present invention includes all the friendly countries or service providers adopting the same self-developed encryption algorithm as the domestic. Thus, when all the countries or service providers adopt standard encryption algorithms, the MCC number list can be set at null. Accordingly no matter whether the subscriber is local or roaming, the CN can determine corresponding encryption algorithm by directly comparing MCC number of the current subscriber with elements of the pre-reserved MCC number list. So the present invention not only effectively solves the conflict between the self-developed encryption algorithm requirement and the standard encryption algorithm selection when the subscriber is roaming, but also completely answers for the service providers'requirement of adopting only standard encryption algorithms.

DETAILED DESCRIPTION OF THE INVENTION

Now, the present invention will be described in detail with reference to the accompanying drawings.

The precondition to realize the method according to the present invention is that if more than one encryption algorithm is defined in the regulation, in order to support international roam in every country of the world, the system is required to support all the standard encryption algorithms, which is the demand that all the prior 3G mobile communication systems must satisfy.

As to the systems of the countries or service providers requiring special encryption algorithms, the CN must support at least one set of self-developed nonstandard encryption algorithm besides all of the standard encryption algorithms mentioned above. Furthermore, for the system subscribers who have to adopt special nonstandard encryption algorithm, the serving terminal and access network must possess all of the standard encryption algorithms and this special nonstandard encryption algorithm simultaneously.

Figure 1:
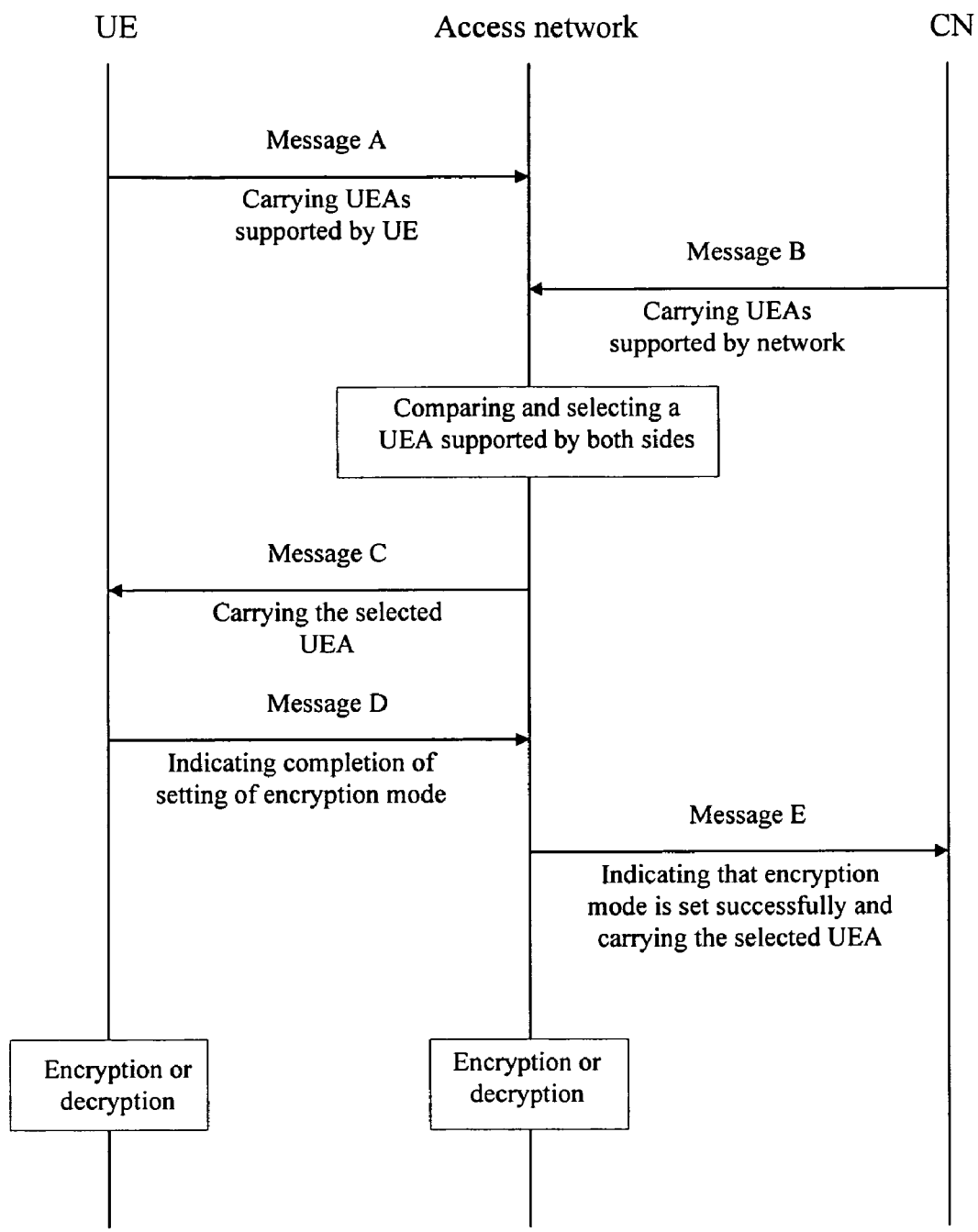
FIG. 1 is a signaling flow chart of determining an encryption algorithm in prior art.
Figure 2:
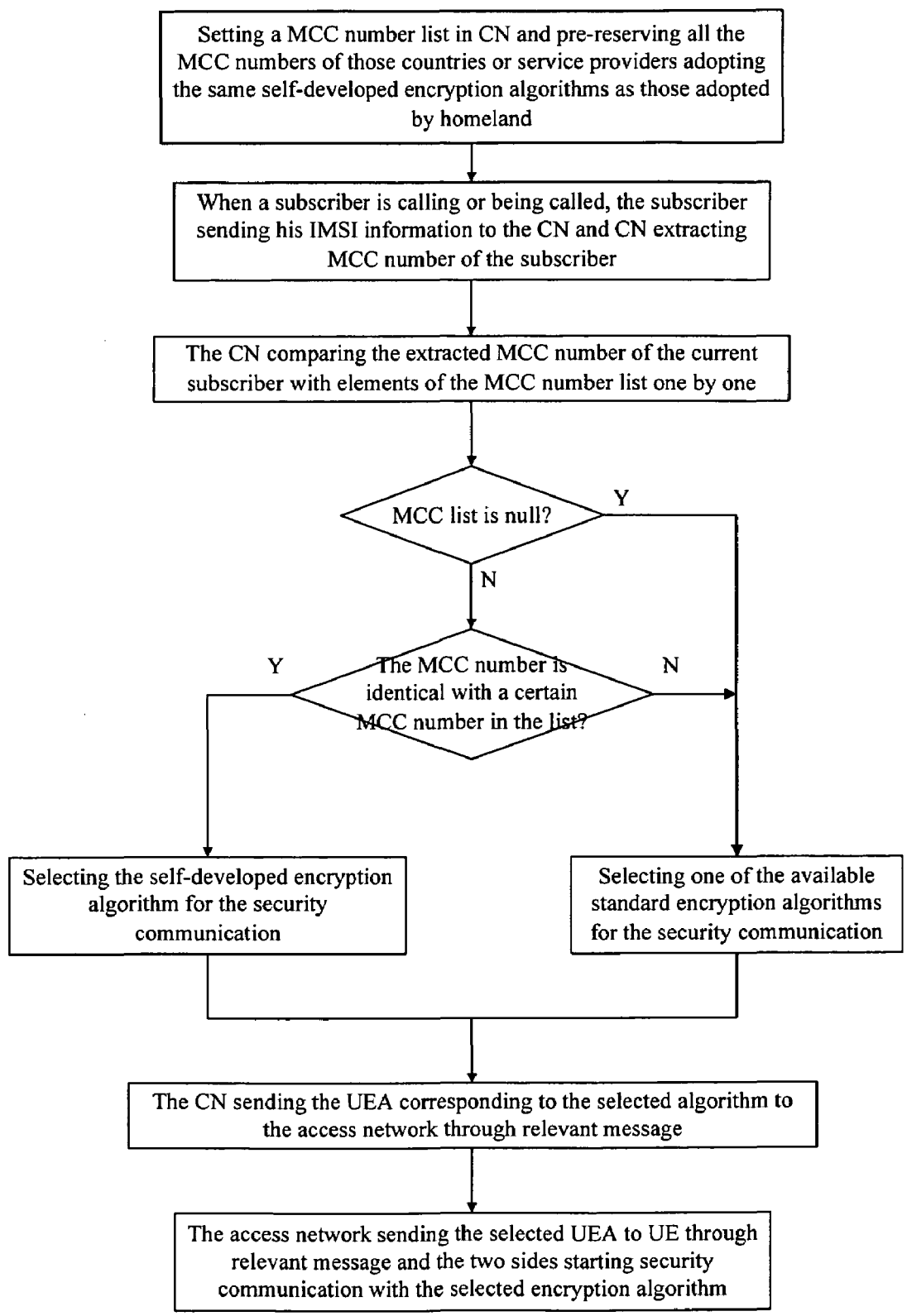
FIG. 2 is a flow chart illustrating the method for determining an encryption algorithm according to the present invention.

Based on the above-mentioned precondition, a scheme for selecting effective encryption algorithm in the CN is provided in the present invention. With reference to FIG. 2, this scheme for selecting encryption algorithm at least comprises the following steps:

1) Firstly, a MCC number list is preset in the CN, and all the MCC numbers of those countries or service providers adopting the same self-developed encryption algorithms as those adopted by the homeland are pre-stored in this MCC number list.

2) When a certain subscriber is calling or is being called, the subscriber sends his own IMSI information to the CN. After receiving the IMSI information, the CN parses the information and extracts the MCC number therefrom, i.e., extracts the MCC number from the IMSI information. The extracted MCC number can be stored in a register temporarily.

3) The CN compares the extracted MCC number of the current subscriber with elements of the MCC number list one by one. If the MCC number of the current subscriber is identical with a certain MCC number in the MCC number list pre-stored in CN, the CN regards this subscriber as a domestic subscriber or a specially permitted subscriber, and selects the self-developed encryption algorithm for the security communication.

4) If the MCC number of the current subscriber is not identical with any MCC number in the MCC number list pre-stored in CN or if the MCC number list is null, the CN regards this subscriber as a foreign subscriber or a roaming subscriber, and selects an available standard encryption algorithm for the security communication.

5) After the encryption algorithm is determined, the CN sends the UEA of the selected encryption algorithm to the access network through a relevant security control message.

6) After receiving the relevant security control message, the access network sets its own security mode and simultaneously sends the UEA of the selected encryption algorithm to UE through a relevant security control message. The UE sets its own security mode according to this message and the two sides start security communication with the selected encryption algorithm.

The above-mentioned steps mainly relate to the selection of encryption algorithm used in security communication. Other implementation procedures about security mode are completely similar to those in the prior art.

According to the method described above, if the MCC number extracted from IMSI information is included in MCC number list, it means this subscriber adopts the domestic nonstandard encryption algorithm; if the MCC number extracted from IMSI information is not included in MCC number list, it means this subscriber supports all of the standard encryption algorithms; if the MCC number list is null, it also means this subscriber supports all of the standard encryption algorithms. In other words, when a domestic subscriber is applying the service inland, the special encryption algorithm will be selected for security communication according to selection of MCC number; if a domestic subscriber is applying the service in a country or in a service provider's system adopting the same nonstandard encryption algorithm as the domestic, this special encryption algorithm will be selected for security communication according to selection of MCC number; if a domestic subscriber is roaming in a country or a service provider's system only supporting the standard encryption algorithms, a certain standard encryption algorithm will be selected for security communication according to selection of MCC number. Similarly, if a subscriber only supporting standard encryption algorithms roams in a country or a service provider's system supporting nonstandard encryption algorithms, a certain standard encryption algorithm will be selected for security communication according to selection of MCC number also; if a subscriber supporting a certain nonstandard encryption algorithm roams in a country or a service provider's system supporting the same nonstandard encryption algorithm, this special encryption algorithm will be selected for security communication according to selection of MCC number.

The method described above not only effectively solves the conflict between requirement for self-developed encryption algorithm and selection of standard encryption algorithm when a subscriber is roaming, but also guarantees security communication among domestic and foreign subscribers by selecting different encryption algorithm according to different zones.

The invention claimed is:

1. A method for determining encryption algorithm used in secured communication based on Mobile Country Code (MCC), comprising:

setting a MCC number list in a Core Network (CN), and storing all MCC numbers of those countries or service providers adopting the same self-developed encryption algorithms as those adopted by the homeland in this MCC number list;

when a User Equipment (UE) is calling or being called, the UE sending an International Mobile Subscriber Identifier (IMSI) information of the current subscriber to the CN, the CN parsing the IMSI information and extracting the MCC number after receiving the IMSI information;

if the MCC number list in the CN is null, the CN directly selecting an available standard encryption algorithm for the secured communication;

otherwise the CN comparing the extracted MCC number of the current subscriber with elements of the MCC number list one by one, and if the MCC number of the current subscriber is identical with a certain MCC number in the MCC number list, the CN selecting the domestic self-developed encryption algorithm for the secured communication, otherwise the CN selecting an available standard encryption algorithm for the secured communication; and the CN instructing the UE and an access network to start secured communication with the selected encryption algorithm.

2. The method of claim 1, wherein said CN instructing the UE and the access network to start secured communication with the selected encryption algorithm comprises:

after selecting the encryption algorithm, the CN sending the User Encryption Algorithm (UEA) of the selected encryption algorithm to the access network; then the access network setting its own secured mode and sending the UEA of the selected encryption algorithm to the UE, the UE setting its own security mode after receiving the UEA;

the UE and the access network starting secured communication with the selected encryption algorithm.

3. The method of claim 1, further comprising: the CN storing the extracted MCC number in a register after extracting the MCC number of the current subscriber.

4. The method of claim 1, the current subscriber supports all of the available standard encryption algorithms if the MCC number list is null.

5. A method for selecting an encryption algorithm used in secure communication based on Mobile Country Code (MCC), comprising:

selecting a MCC number list in a Core Network (CN), and storing in the selected MCC number list all MCC numbers of those countries or service providers adopting a self-developed encryption algorithm adopted by a homeland;

when a User Equipment (UE) initiates or receives a call, the UE sending International Mobile Subscriber Identifier (IMSI) information of a current subscriber to the CN, the CN parsing the IMSI information and extracting the MCC number from the IMSI information;

if the MCC number list in the CN is null, the CN directly selecting an available standard encryption algorithm for the secure communication; otherwise, the CN comparing the extracted MCC number of the current subscriber with the MCC numbers stored in the MCC number list, and if the MCC number of the current subscriber is identical with a matching MCC number in the MCC number list, the CN selecting the domestic self-developed encryption algorithm for the secure communication; otherwise, the CN selecting an available standard encryption algorithm for the secure communication.

6. The method of claim 5, further comprising:

the CN sending the User Encryption Algorithm (UEA) of the selected encryption algorithm to an access network;

the access network setting its own security mode and sending the UEA of the selected encryption algorithm to the UE; and the UE setting its own security mode after receiving the UEA.

7. The method of claim 5, further comprising: the CN storing the extracted MCC number in a register after extracting the MCC number of the current subscriber.

8. The method of claim 1, wherein the current subscriber supports all of the available standard encryption algorithms if the MCC number list is null.

9. A method for selecting an encryption algorithm used in secure communication based on Mobile Country Code (MCC), comprising:

selecting a MCC number list in a Core Network (CN), and storing in the selected MCC number list all MCC numbers of those countries or service providers adopting a self-developed encryption algorithm adopted by the homeland;

when a User Equipment (UE) initiates or receives a call, the UE sending International Mobile Subscriber Identifier (IMSI) information of a current subscriber to the CN, the CN parsing the IMSI information and extracting the MCC number from the IMSI information;

if the MCC number list in the CN is null, the CN directly selecting an available standard encryption algorithm for the secure communication;

otherwise, the CN comparing the extracted MCC number of the current subscriber form the IMSI information with the MCC numbers stored in the MCC number list, and if the MCC number of the current subscriber is identical with a matching MCC number in the MCC number list, the CN selecting the domestic self-developed encryption algorithm for the secure communication; otherwise, the CN selecting an available standard encryption algorithm for the secure communication, the selected encryption algorithm being used by the UE for secure communication.

10. The method of claim 9, further comprising:

the CN sending the User Encryption Algorithm (UEA) of the selected encryption algorithm to an access network;

the access network setting its own security mode and sending the UEA of the selected encryption algorithm to the UE; and the UE setting its own security mode after receiving the UEA.

11. The method of claim 9, further comprising the CN storing the extracted MCC number in a register after extracting the MCC number of the current subscriber.

12. The method of claim 9, wherein the current subscriber supports all of the available standard encryption algorithms if the MCC number list is null.

* * * * *